(12) United States Patent
Tian et al.

(10) Patent No.: US 8,644,384 B2
(45) Date of Patent: *Feb. 4, 2014

(54) VIDEO CODING REFERENCE PICTURE PREDICTION USING INFORMATION AVAILABLE AT A DECODER

(71) Applicant: Cisco Technology, Inc., San Jose, CA (US)

(72) Inventors: Dihong Tian, San Jose, CA (US); J. William Mauchly, Berwyn, PA (US); Joseph T. Friel, Ardmore, PA (US); Wen-hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,588

(22) Filed: Jan. 24, 2013

(65) Prior Publication Data

US 2013/0136185 A1    May 30, 2013

Related U.S. Application Data

(63) Continuation of application No. 12/412,298, filed on Mar. 26, 2009, now Pat. No. 8,363,721.

(51) Int. Cl.
*H04N 11/02* (2006.01)

(52) U.S. Cl.
USPC .................................................... 375/240.12

(58) Field of Classification Search
USPC ........................................ 375/240.01–240.29
See application file for complete search history.

(56) References Cited

U.S. PATENT DOCUMENTS

| 6,084,912 | A | 7/2000 | Reitmeier et al. |
| 7,242,716 | B2 | 7/2007 | Koto et al. |
| 7,310,373 | B2 | 12/2007 | Kondo et al. |
| 2004/0190614 | A1 | 9/2004 | Schlockermann et al. |
| 2006/0039617 | A1 | 2/2006 | Makai et al. |
| 2008/0056370 | A1 | 3/2008 | Nakaya et al. |
| 2008/0240247 | A1 | 10/2008 | Lee et al. |

OTHER PUBLICATIONS

T. Wiegand et al. "Affine multipicture motion-compensation prediction," *IEEE Transactions on Circuits and Systems for Video Technology.* Feb. 2005, vol. 15, No. 2, pp. 197-209.

K. Zhang et al. "Image sequence coding using Multiple-level segmentation and affine motion estimation." *IEEE Journal on selected areas in Communications.* Dec. 1997, vol. 15, No. 9, pp. 1704-1713.

J.Y.A Wang et al. "Representing moving images with layers." *IEEE Transactions on Image Processing,* Sep. 1994, vol. 3, No. 5, pp. 625-638.

(Continued)

*Primary Examiner* — Dave Czekaj
*Assistant Examiner* — Leron Beck

(57) ABSTRACT

A video coder includes a forward coder and a reconstruction module determining a motion compensated predicted picture from one or more previously decoded pictures in a multi-picture store. The reconstruction module includes a reference picture predictor that uses only previously decoded pictures to determine one or more predicted reference pictures. The predicted reference picture(s) are used for motion compensated prediction. The reference picture predictor may include optical flow analysis that uses a current decoded picture and that may use one or more previously decoded pictures together with affine motion analysis and image warping to determine at least a portion of at least one of the reference pictures.

20 Claims, 7 Drawing Sheets

(56) References Cited

OTHER PUBLICATIONS

I. Rekleitis, "Visual motion estimation based on motion blur interpretation," Thesis, McGill University, Canada, 1995. Retrieved on Nov. 14, 2008 at <http://www.cim.mcgill.ca/~yiannis/mscthesis.html>.

"Multi-frame Motion-Compensated Prediction", on Website of Fraunhofer Institut für Nachrichtentechnik, Heinrich-Hertz-Institut, Image Processing Department, Alt Moabit 74, D-10555 Berlin, Germany, Retrieved on Nov. 14, 2008 at <http://ip.hhi.de/imagecom_G1/mfp.htm>.

M. Karczewicz et al. "Video coding using motion compensation with polynomial motion vector fields," IEEE COMSOC, First International workshop on Wireless Image/Video Communications, Sep. 1996, pp. 26-31.

Kordasiewicz et al, "Encoding of Affine Motion Vectors," IEEE Transactions on Multimedia, vol. 9 No. 7, pp. 1346-1356, Nov. 2007.

US 8,644,384 B2

VIDEO CODING REFERENCE PICTURE PREDICTION USING INFORMATION AVAILABLE AT A DECODER

RELATED APPLICATION(S)

The present Application is a continuation of U.S. patent application Ser. No. 12/412,298, filed 26 Mar. 2009 to inventors Tian et al., now U.S. Pat. No. 8,363,721, the contents of which are incorporated herein by reference.

FIELD OF THE INVENTION

The current disclosure relates generally to video compression.

BACKGROUND

Video coding, called video compression, is known, and typically includes both intra-coding using only a currently encoded picture (the "current picture"), typically a video frame, and inter-coding, which encodes the difference between the current picture and a predicted picture determined from the current picture and one or more previously encountered pictures, called reference pictures that are typically decoded versions of previously encoded pictures. Motion compensated predictive coding (MCPC) improves the predicted picture by using motion-compensated prediction (MPC) including determining motion vectors between one or more selected reference pictures and the current picture to reduce the difference between the current picture and the prediction thereof. Such methods have been improved upon over the years. The current H.264/AVC standard, for example, includes a long-term reference memory (LTRM) to extend MCP to multiple reference pictures—pictures in this context are usually video pictures—including both recently-coded and selected older pictures. While the predicted picture is improved, additional bits are required to be transmitted. MCPC can further be improved using affine motion compensation—determining how portions of one or more reference pictures can be warped to improve the prediction. This uses affine motion estimation between the current picture and one or more previously decoded pictures. When combined with LTRM, a multi-picture buffer is extended to include warped versions of the previously decoded picture(s) in correspondence to estimated affine motion parameters. Because affine motion estimation is performed at the encoding side, the affine motion parameters need to be transmitted as side information to enable correct decoding. This, like using LTRM, requires more bits to be transmitted.

DESCRIPTION OF EXAMPLE EMBODIMENTS

Overview

Figure 1A:
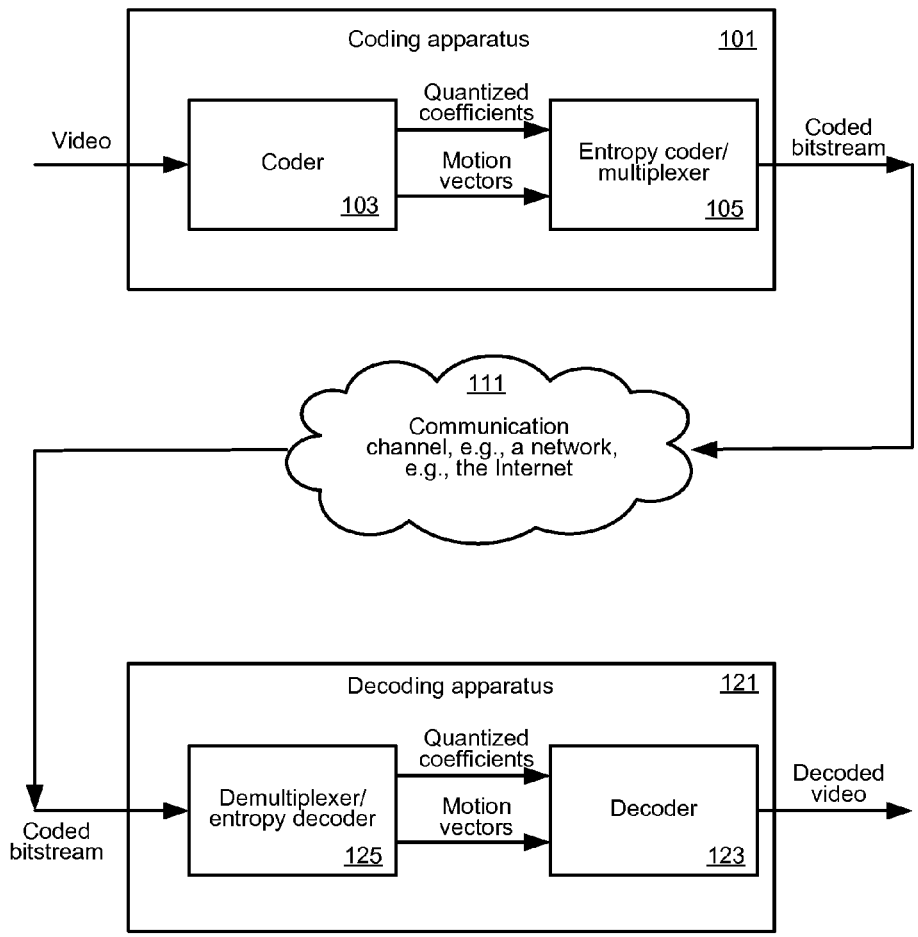
FIG. 1A shows a simplified block diagram of an embodiment of a coding apparatus that includes one or more features of the present invention and that is configured to implement a video coding method that includes one or more features of the present invention.

Embodiments of the current invention relate to video coding using one or more reference pictures that are constructed from past decoded pictures and other information that is available at a decoder, so that minimal side information needs to be transmitted to a decoder or stored for later decoding.

A video coder includes a forward coder configured to accept a current picture and configured to determine quantized transform coefficients of a difference picture, and a reconstruction module configured to determine a predicted picture from the quantized coefficients and from one or more previously decoded pictures in a multi-picture store. The reconstruction module includes a reference picture predictor that synthesizes one or more predicted reference pictures using only previously decoded picture(s). The one or more predicted reference pictures are used for motion compensated prediction. One embodiment of the reference picture predictor includes optical flow analysis that uses a current decoded picture and that may use one or more previously decoded pictures together with affine motion analysis and image warping to determine at least a portion of at least one of the reference pictures. One embodiment further includes for portion(s) uncovered by the affine motion analysis prediction of the uncovered portion(s) based on prediction using one or more previously decoded pictures, e.g., from the multi-picture store, such that at least one predicted reference picture includes the uncovered region predicted using the previously decoded picture(s) and the portion(s) determined by the optical flow analysis. One embodiment of the optical flow analysis includes intra-picture optical flow analysis to predict motion in picture parts of a current decoded picture combined with affine motion analysis and image warping to determine at least a portion of at least one of the reference pictures. One embodiment of the optical flow analysis includes inter-picture optical flow analysis using the current decoded picture and one or more previously decoded pictures to predict motion in picture parts combined with affine motion analysis and image warping to determine at least a second portion of at least one of the reference pictures. One embodiment combines inter-picture optical flow analysis and intra-picture optical flow analysis. In one embodiment, the multi-picture store includes a buffer of one or more predicted reference pictures.

Particular embodiments include a method comprising accepting a current picture for decoding, determining blocks of a difference picture from the accepted current picture and motion compensated predicted picture blocks, and transforming and quantizing the blocks of a difference picture to determine quantized transform coefficients being for inclusion in a coded bitstream. The method also comprises predicting one or more predicted reference pictures using one or more previously decoded pictures stored in a multi-picture store and the quantized transform coefficients; and determining the motion compensated predicted picture blocks and motion vectors therefor from the quantized transform coefficients and at least one of the predicted reference pictures. The determined motion vectors are for inclusion in the coded bitstream. Determining a motion compensated predicted picture block includes searching through the predicted reference pictures to determine a selected predicted reference picture for the block. The predicting one or more predicted reference pictures may include optical flow analyzing that uses a current decoded picture and that may use one or more previously decoded pictures to predict motion in a set of one or more parts of a current decoded picture, combined with affine motion analyzing and image warping for determining at least a portion of at least one predicted reference picture. Affine motion parameters determined by the affine motion analysis need not be transmitted to a decoder or stored for later decoding.

Particular embodiments include an apparatus comprising an input module configured to accept a coded bitstream and to generate quantized transform coefficients and motion vectors from the coded bitstream. The apparatus also comprises an inverse quantizer/inverse transformer configured to accept the quantized coefficients and generate a decoded difference picture, and a summer configured to determine a decoded picture from a motion compensated predicted picture and the decoded difference picture. The apparatus further comprises a multi-picture store for storing previously decoded pictures, and a reference picture predictor coupled to the multi-picture store and configured to determine one or more predicted reference pictures using one or more previously decoded pictures. The apparatus further comprises a motion compensated predictor configured to determine the motion-compensated prediction picture from one or a plurality of the one or more predicted reference pictures, and the motion vectors. The reference picture predictor may include an optical flow analyzer that uses a current decoded picture and that may use one or more previously decoded pictures to predict motion in a first set of one or more parts of a current decoded picture, combined with affine motion analysis and image warping to determine at least a portion of at least one reference picture.

Particular embodiments include an apparatus comprising one or more processors and a storage subsystem including a multi-picture store configured to store a plurality of pictures. The storage subsystem is further configured with a set of instructions that when executed by one or more of the processors cause the apparatus to accept a current picture for decoding, determine blocks of a difference picture from the accepted current picture and motion compensated predicted picture blocks, and transform and quantize the blocks of a difference picture to determine quantized transform coefficients being for inclusion in a coded bitstream. The set of instructions when executed further cause the apparatus to predict one or more predicted reference pictures using one or more previously decoded pictures stored in a multi-picture store and the quantized transform coefficients, and to determine the motion compensated predicted picture blocks and motion vectors therefor from the quantized transform coefficients and at least one of the predicted reference pictures. The determined motion vectors are for inclusion in the coded bitstream. Determining a motion compensated predicted picture block includes searching through the predicted reference pictures to determine a selected predicted reference picture for the block. The predicting one or more predicted reference pictures may include optical flow analyzing that uses a current decoded picture and that may use one or more previously decoded pictures to predict motion in a set of one or more parts of a current decoded picture, combined with affine motion analyzing and image warping for determining at least a portion of at least one predicted reference picture. Affine motion parameters determined by the affine motion analysis are not transmitted to a decoder or stored for later decoding.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Embodiments

FIG. 1A shows a simplified block diagram of an embodiment of a coding apparatus 101 configured to implement a video coding method including accepting video that includes a sequence of pictures and coding the accepted video to generate a coded bitstream, and an embodiment of a decoding apparatus 121 configured to implement a video decoding method including accepting a coded bitstream and decoding the coded bitstream to generate decoded video that includes a sequence of decoded pictures. The two apparatuses are shown in FIG. 1A coupled via a communication channel 111. Such a channel 111 may be a network, e.g., a dedicated network or a public network such as the Internet, or may be a dedicated communication system. The coding apparatus 101 includes an embodiment of a novel hybrid transform-based motion compensated predictive coder 103 implementing a MCPC method that is configured to generate quantized coefficients and additional information that include motion vectors and, in the case of multiple reference pictures being used, any needed indication of which reference picture to use. One feature of embodiments of the invention is that the reference picture used takes into account affine transformations, but that affine transformation parameters need to be sent. The coding apparatus 101 includes an entropy coder/multiplexer 105 configured to entropy encode the coefficients, to encode the additional information—the motion vectors—and to generate the coded bitstream. The decoding apparatus 121 includes a demultiplexer/entropy decoder 125 configured to determine quantized coefficients and such additional information as motion vectors from a coded bitstream and an embodiment of a novel hybrid transform-based motion compensated predictive decoder 123 implementing a decoding method matched to the MCPC method of coder 103 and that is configured to decode the determined quantized coefficients and such additional information as motion vectors to generate decoded video.

More details of the coder 103 and decoder 123 are provided herein below.

Different embodiments of the coding apparatus 101 and of the decoding apparatus 121 may be implemented using special purpose hardware, and alternately using processing systems that include one or more processors such as one or more general purpose programmable computing devices, e.g., microprocessors, and/or using one or more digital signal processing (DSP) devices, and/or using one or more graphic processing units (GPUs). Alternate embodiments also may use a combination of special purpose hardware and one or more programmable devices such as microprocessors, DSPs and/or GPUs. Designing chips that include both special purpose hardware and programmable devices is common using, for example, cores that provide the programmable components as designs for chip portions. The invention therefore is not limited to any one such implementation.

The coding and decoding will be described in terms of a sequence of pictures. The pictures may be frames, or in the case of interlaced video, fields. For simplicity, non-interlaced video is assumed so that each picture is a frame. Any modifications required in the description herein to accommodate interlaced video would be clear to one skilled in the art, and the description herein is certainly not limited to non-interlaced video.

Figure 1B:
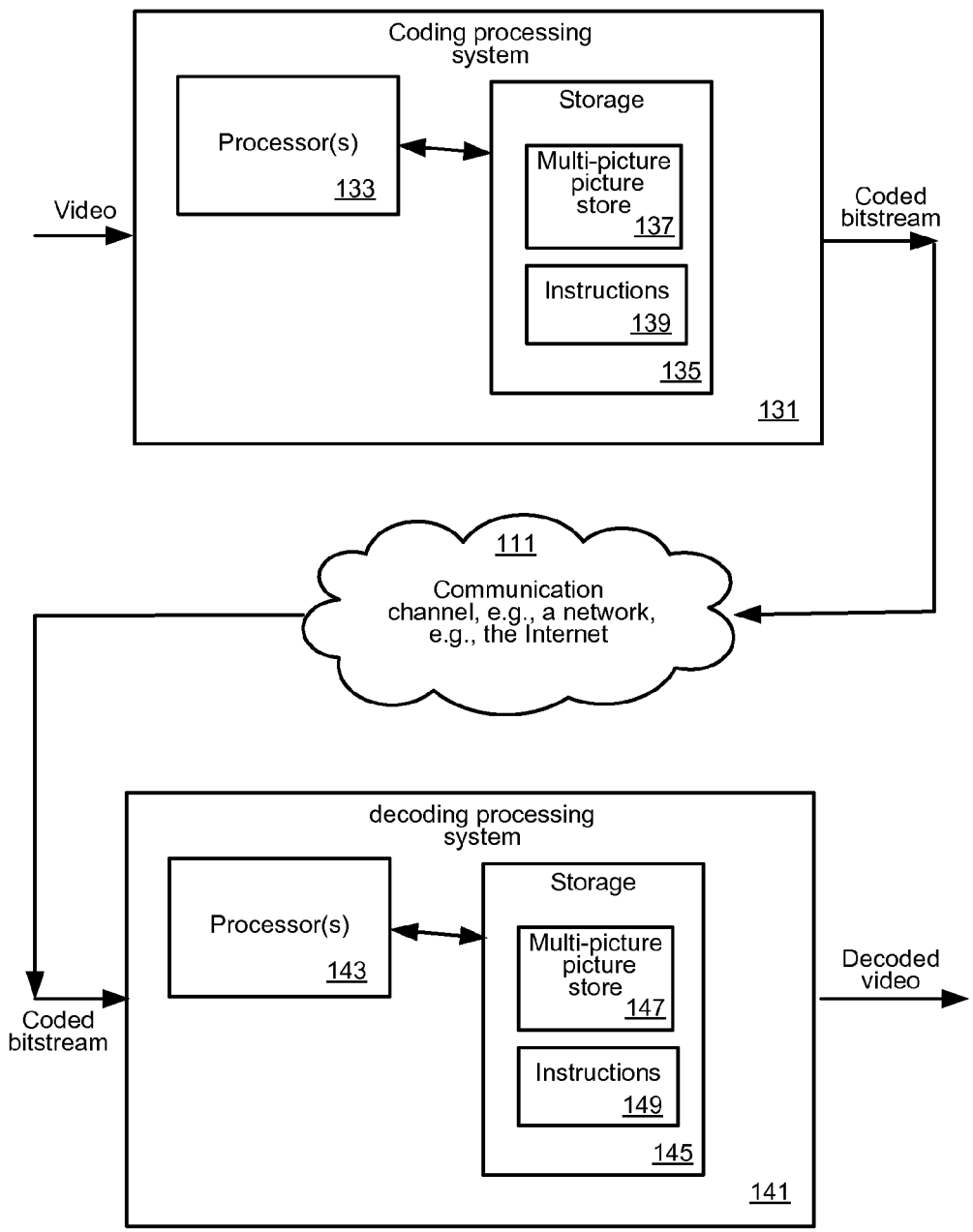
FIG. 1B shows an implementation of coding apparatus as a coding processing system that includes one or more processors coupled to a storage system, and a decoding apparatus as a decoding processing system that includes one or more processors coupled to a storage system. Coding and/or decoding performed in the systems of FIG. 1B include one or more features of the present invention.

FIG. 1B shows an implementation of coding apparatus 101 as a coding processing system 131 that includes one or more processors 133 coupled to a storage system 135. The storage subsystem 135 includes, for example, memory. The storage subsystem includes instructions 139 that when executed by the one or more processors 133 implement a novel MCPC method to generate quantized coefficients and additional information such as motion vectors, and an entropy coder/multiplexing method to generate a coded bitstream. The storage subsystem further includes a multi-picture store 137 configured to store previously decoded pictures and/or reference pictures used by the novel MCPC method. FIG. 1B also shows an implementation of decoding apparatus 121 as a decoding processing system 141 that includes one or more processors 143 coupled to a storage system 145. The storage subsystem 145 includes, for example, memory one or more processors The storage subsystem 145 includes instructions 149 that when executed by the one or more processors 143 implement a novel MCP-based decoding method to determine quantized coefficients and the additional information such as motion vectors from a coded bitstream and a demultiplexing/entropy decoder method to generate decoded video from quantized coefficients and additional information such as motion vectors. The storage subsystem further includes a multi-picture store 147 configured to store previously decoded pictures and/or reference pictures used by the novel MCP-based decoding method.

Figure 2:
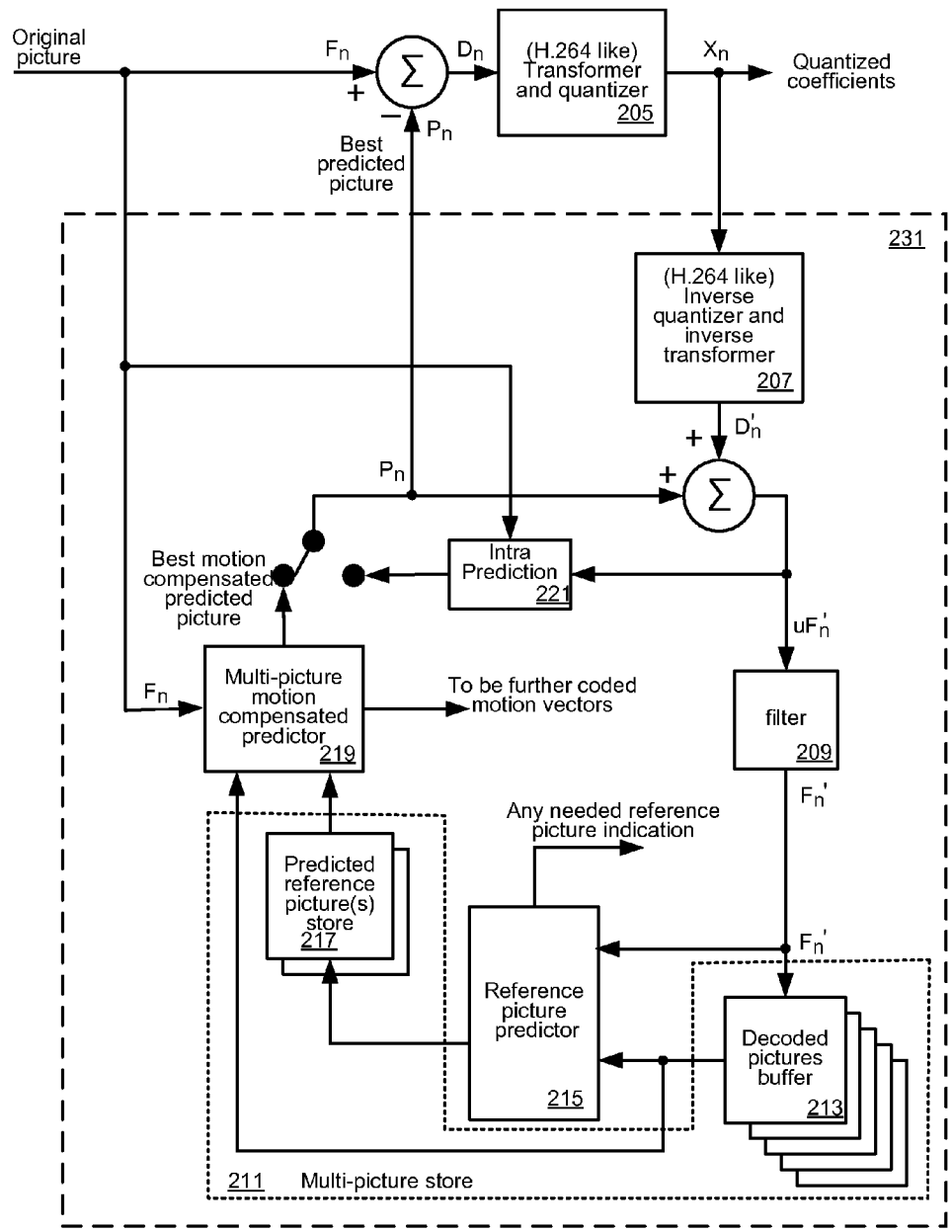
FIG. 2 shows a simplified block diagram of an embodiment of a novel motion compensated predictive coder.

FIG. 2 shows a simplified block diagram of an embodiment of a novel MCPC 103 including a difference picture determiner (a summer) to subtract a selected, e.g., best predicted picture denoted $P_n$ from a currently to-be-encoded picture denoted $F_n$, e.g., a current video frame, where the subscript n denotes the current picture, and "current" is used to denote currently being encoded or determined. The difference picture determiner determines a current difference picture denoted $D_n$. The MCPC 103 includes a forward coder 205—a transformer and quantizer module 205 to generate current quantized transform coefficients denoted $X_n$. The MCPC 103 further includes a reconstruction module 231 (also called a reconstruction loop) shown in broken lines configured to reconstruct the selected, e.g., best predicted picture denoted $P_n$ from the quantized transform coefficients denoted $X_n$. The reconstruction module 231 includes an inverse quantizer and inverse transformer module 207 to determine a decoded current difference picture denoted $D'_n$ where the prime is used to indicate decoded, and a summer to add the current predicted picture $P_n$ to decoded difference picture $D'_n$ to determine a raw, unfiltered decoded picture, denoted $uF'_n$, where the u denotes unfiltered. The unfiltered decoded picture $uF'_n$ is filtered by a filter 209, e.g., for reducing deblocking artifacts or other purpose(s) commonly used in block based coding to generate the current decoded picture $F'_n$. The reconstruction module 231 of novel MCPC 103 includes a multi-picture store 211 shown within dotted lines in FIG. 2 that has a decoded picture buffer 213 as part of a multi-picture store 211 and configured to store one or more previously decoded pictures denoted $F'_{n-1}, F'_{n-2}, \ldots$, into which the current $F'_n$ also is stored.

The coder also includes an intra prediction mode in which an intra prediction module 221 shown in the dashed-line block in FIG. 2 and that uses the decoded picture $uF'_n$ to predict the picture $P_n$ to use for determining the difference picture $D_n$.

Not shown in FIG. 2 are control modules or signals that deal with the selection of the prediction mode and other control signals. Other details also are left out for the sake of simplicity of explanation.

One novel feature of the reconstruction module 231 is a reference picture predictor 215 that is configured to determine one or a plurality of predicted reference pictures from decoded pictures $F'_n$ and one or more decoded pictures from decoded picture buffer 213. The predicted reference pictures may be stored, although, so long as identical methods of generating such pictures can operate in a matching decoder, such storage is not necessary. Thus, in some embodiments, the one or more predicted reference pictures are stored in a predicted reference picture store 217, e.g., that is part of the multi-picture store 211. Another novel feature is a multi-picture motion compensation predictor 219 that is configured to determine a motion-compensated prediction picture, including any needed motion parameters such as motion vectors from one or a plurality of the predicted reference pictures 217. In particular, for any picture element, e.g., a block or macroblock or other picture portion, the MCP of element 219 includes searching through the predicted reference pictures (and in some embodiments, the previously decoded pictures), e.g., searching the multi-picture store 211 to determine a selected, e.g., the best reference picture for each element, e.g., each block or macroblock.

The reference picture predictor 215 includes an optical flow analyzer that in one embodiment uses intra-picture optical flow analysis on the current decoded picture $F'_n$ and inter-picture optical flow analysis, e.g., motion estimation for predicting pixel values of the moving regions using the current decoded picture and also one or more previously decoded pictures. Optical flow analyzer includes affine motion analysis and reference picture warping to determine at least a portion of one or more predicted reference pictures. The reference picture predictor 215 further is configured to use previously decoded pictures from the decoded picture buffer 213 to predict pixel values of uncovered regions resulting from object motion.

Those in the art would be familiar with affine transformation. Such transformation preserve collinearity relation between points, i.e., three points which lie on a line continue to be collinear after the transformation, and further preserve relations of distances along a line. In general, an affine transform is composed of linear transformations such as rotation, scaling and/or shear, and/or a translation (a shift). Several such linear transformations can be combined into a single one and result in a single affine transformation. In common representations, an affine transformation is represented by a set of affine transformation parameters, also called affine motion parameters when applied to determining motion.

One feature of an embodiment of MCPC 103 is that affine motion estimation is used, but the affine motion parameters are not needed to be sent to a decoder, so that no additional bits are needed for sending affine motion parameters. A decoder can create any needed affine parameters using the decoded past pictures and the information received for decoding the current picture.

Figure 3:
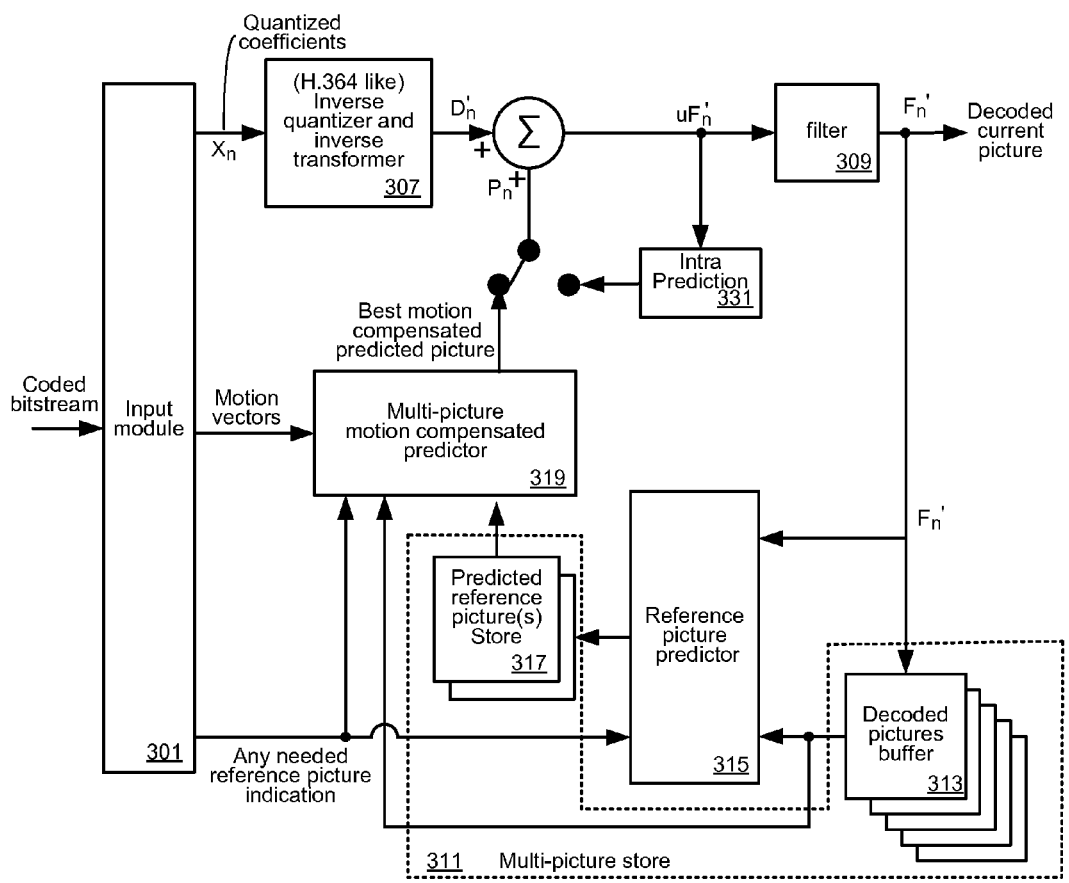
FIG. 3 shows a simplified block diagram of an embodiment of a novel motion compensated predictive decoder, e.g., that can decode a bitstream produced by the coder of FIG. 2.

FIG. 3 shows a simplified block diagram of one embodiment of a MCP decoder 123 that can decode a bitstream including quantized coefficients $X_n$ coded using the MCPC 103. The decoder 123 includes an input module configured to accept a coded bitstream and output quantized coefficients $X_n$ of a difference picture, motion vectors, and any needed reference picture indication for decoding the bitstream. The MCP decoder 123 further includes an inverse quantizer/inverse transformer module 307 that determines a decoded difference picture $D'_n$ from the currently being decoded quantized coefficients $X_n$. A summer adds a current predicted picture $P_n$ to generate a decoded unfiltered picture $uF'_n$ which is filtered by a filter module 309 to generate the current decoded picture $F'_n$ The decoder 123 includes a multi-picture store 311 that includes a decoded pictures buffer 313 that can store one or more previously decoded pictures, and that is designed to match the structure of the multi-picture store 211 in the coder. The portion to generate the selected, e.g., best motion predicted picture $P_n$ includes the decoded pictures buffer 313 configured to store previously decoded pictures denoted $F'_{n-1}$, $F'_{n-2}, \ldots$, into which the current picture $F'_n$ also is stored. One novel feature of the decoder 123 is a reference picture predictor 315 that is configured to generate one or a plurality of predicted reference pictures from the current decoded picture $F'_n$ and one or more previously decoded pictures from the contents of the decoded picture buffer 313. In the case that the coder uses pre-stored predicted reference pictures in a predicted reference picture store 217, one embodiment of the decoder 123 may include a predicted reference picture store 317, e.g., as part of multi-picture store 311 configured to store and maintain one or a plurality of predicted reference pictures. One or more previously predicted pictures are used with the motion vector(s) and any other indication sent to the decoder to determine the best motion compensated predicted picture by a multi-picture motion compensated predictor 319. Of course, those in the art would understand that so long as the predicted reference picture(s) used by the multi-picture motion compensated predictor 319 can be determined at the decoder, there is no need for the predicted reference picture store 317.

The elements of the decoder 123 are similar to the elements of the reconstruction module 231 of FIG. 2 used for decoding.

Note the novel feature that while affine motion parameters may be used for the encoding, no affine motion parameters need be sent in the bitstream to decode the picture. This results from the fact that the affine motion parameters in the encoder are determined using only information that can be generated at the decoder.

Figure 4:
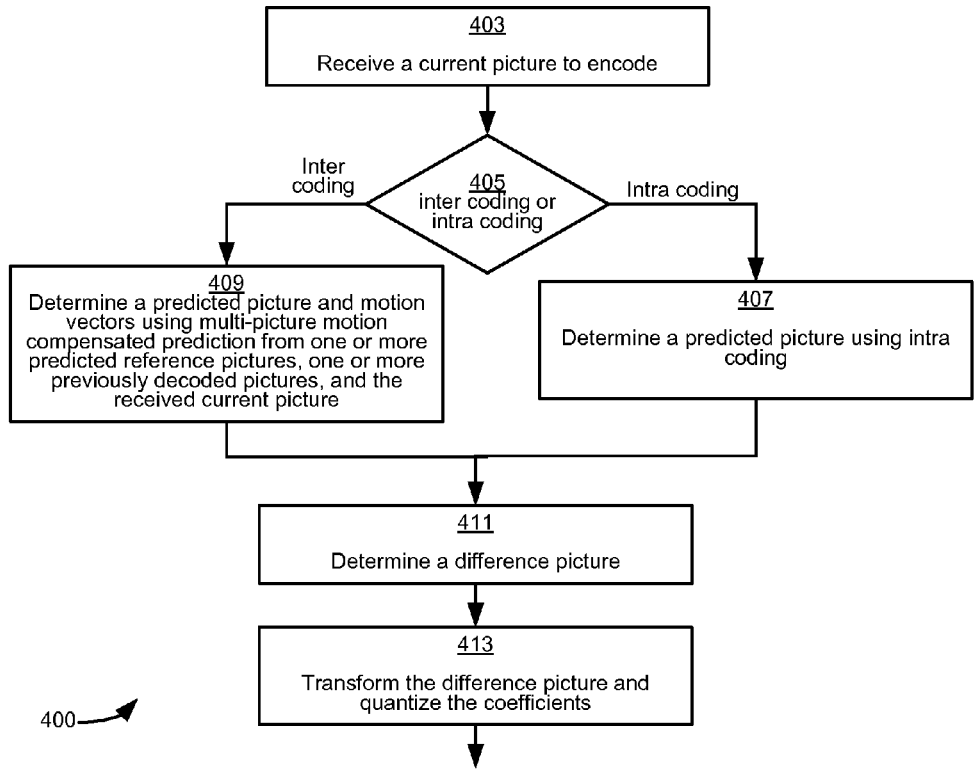
FIG. 4 shows a flowchart describing a coding method embodiment that includes one or more features of the current invention.

FIG. 4 shows a flowchart describing a coding method embodiment 400 that includes one or more features of the current invention. The method 400 includes in 403 receiving a current picture to encode, in 405 determining if inter coding or intra coding, in 407, in the case of intra coding, determining a predicted picture using intra coding; or in 409, in the case of inter coding, determining motion vectors and a predicted picture using multi-picture motion-compensated prediction based on one or more predicted reference pictures, one or more previously decoded pictures, and the current picture. In particular, for any picture element, e.g., a block or macroblock or other picture portion, the MCP of element 409 includes searching through all predicted reference pictures to determine a selected, e.g., the best reference picture for each element, e.g., each block or macroblock. The search, for example, is of a multi-picture store. The motion vectors are to be used by a decoder. The method further includes in 411 determining a difference picture from the predicted picture and the received current picture, and in 413 transforming the difference picture and quantizing the coefficients to determine quantized coefficients, e.g., for transmission with the motion vectors to a remote endpoint that includes a decoder, or for storing for later decoding.

FIG. 4 also shows a flowchart of a method 420 for determining the information for steps 407 and 409 of determining the predicted picture for the case of intra coding and inter coding, respectively, including, in 415 inverse quantizing and inverse transforming the quantized coefficients to determine an unfiltered difference picture and in 417 determining a current unfiltered decoded picture. The intra coding uses the unfiltered decoded picture. For inter coding, determining the predicted picture includes determining the one or more predicted reference pictures, including in 419 filtering the unfiltered decoded picture to determine a current decoded picture, and in 421 determining the one or more predicted reference pictures from the current decoded picture and one or more previously decoded pictures, e.g., from a decoded picture store.

Predicting one or a plurality of reference pictures from decoded pictures with a memory configured to store multiple decoded pictured is now described in more detail. In particular, the operation of element 215 (the reference picture predictor of FIG. 2), element 315 (the reference picture predictor of FIG. 3) and element 421 (the step of determining predicted reference picture(s)) is described. Each of these elements takes in the decoded pictures in a multi-picture decoded picture buffer and outputs one or multiple predicted reference pictures for use in predicting pictures. These predicted reference pictures are stored in a predicted reference store. By "reference picture store, or reference picture memory" is meant the combination of the multi-picture decoded picture buffer and the predicted reference store, which in one embodiment is a single memory for storing pictures.

For simplicity, the operation of an embodiment of the reference picture predictor 215 of FIG. 2 is described. One embodiment of the reference picture predictor 315 is to this embodiment 215, and implements the method step 421.

Figure 5:
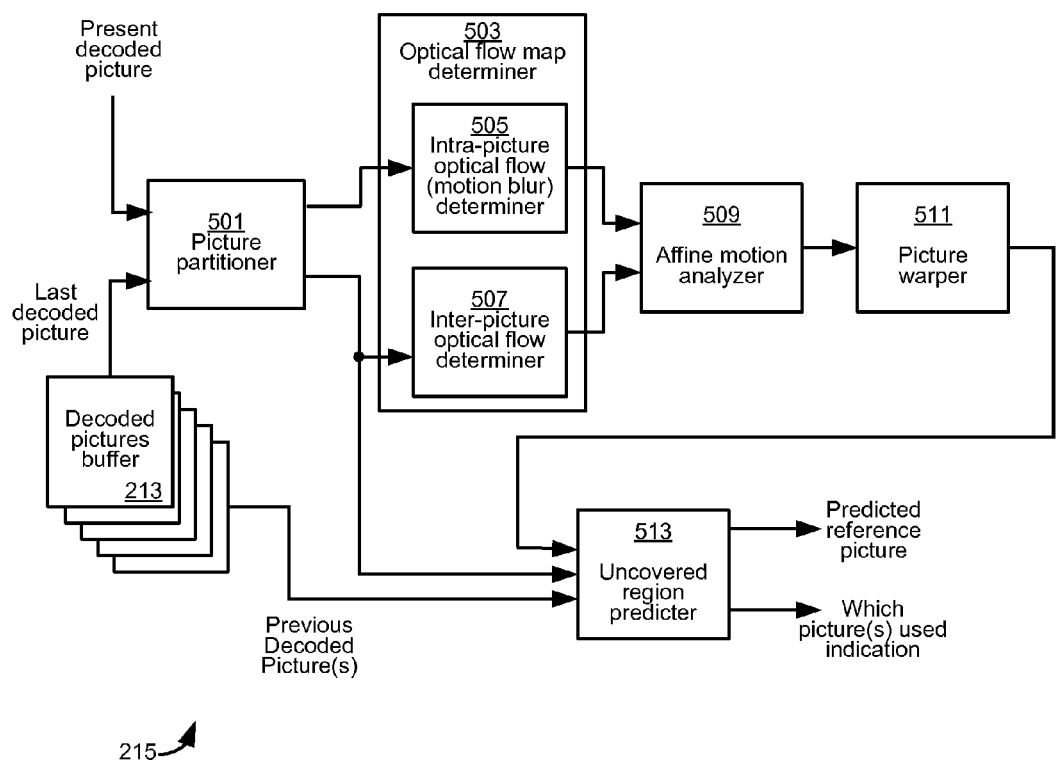
FIG. 5 shows a block diagram of one embodiment of a reference picture predictor that includes one or more features of the current invention.

FIG. 5 shows a block diagram of one embodiment of the reference picture predictor 215. The embodiment includes an optical flow analyzer that uses affine motion model based picture warping, and also includes pixel prediction of uncovered portions of the picture using previously decoded picture (s).

The predictor 215 includes a picture partitioner 501 configured to partition the current decoded picture into regions. In one embodiment the regions are rectangular blocks. In another embodiment, the regions are not limited to being rectangles blocks, but may have arbitrary shape, the partitioning using one or more pre-defined criteria. Such criteria may be simple heuristics, or in another embodiment based on detection of objects, and in yet another embodiment, regions of coherent motion determined by motion analysis, in which case the picture practitioner 501 also uses a previously decoded picture from the store 213. Such methods of determining regions would be known to those in the art. In yet another embodiment, the current decoded picture is partitioned into multiple layers as described below.

In the remainder, each region determined by the partitioner 501 is in general termed a block or object or region to indicate it may be a block or an object or region of arbitrary shape.

The reference picture predictor 215 includes an optical flow analyzer comprising blocks 503, 509, and 511. In more detail, includes an optical flow map determiner 503 coupled to the region determiner 501 and configured to determine one or more block-based or object-based or in general region-based optical maps. The optical flow map determiner 503 is coupled to an affine motion analyzer 509 that is configured to determine a set of affine motion parameters for each block or object or region for which there is optical flow in the one or more maps.

In one embodiment, as described in more details below, the optical flow map determiner 503 includes an inter-picture based optical flow map determiner 507 that determines optical flow between the one or more previously decoded pictures and the current decoded picture, e.g., between a block or object or region in the most recent previously decoded picture and the corresponding block or object or region in the current decoded picture. In such an embodiment, the picture partitioner 501 also is configured to partition the one or more previously decoded pictures from the store 213 used by the inter-picture flow map determiner 507.

In one embodiment, as described in more details below, the optical flow map determiner 503 further includes an intra-picture based optical flow determiner configured to determine an intra-picture optical flow map within the current decoded picture.

Furthermore, some embodiments of reference prediction also include determining optical flow on an intra-picture based using only the current decoded picture.

In the case both an intra-picture and an inter-picture optical flow map are determined, the affine motion analyzer 509 is configured to analyze both optical flow maps, either in one embodiment in combined form, or in another embodiment separately to determine a set of affine motion parameters either for the combined map, or for each map.

A picture warper 511 is configured to apply the affine motion parameters to the current decoded picture to form a warped picture, wherein at least portions are warped.

Thus, some embodiments of reference picture predictor 215 include an inter-picture optical flow analyzer comprising an inter-picture optical flow determiner, an affine transform analyzer, and an image warper. Other embodiments of reference picture predictor 215 include an intra-picture optical flow analyzer comprising an intra-picture optical flow determiner, an affine transform analyzer, and an image warper. Yet other embodiments of reference picture predictor 215 include both an intra-picture optical flow analyzer and an inter-picture optical flow analyzer.

Some embodiments of reference prediction also include determining motion using a plurality of past decoded pictures for regions not covered by the inter-picture flow determination and/or the intra-picture flow determination and/or a combination thereof. By a region or block not being covered is meant that there is no motion detected in such region or block. For example, in embodiments in which only the most recent decoded picture and the current decoded picture is used for inter-picture optical flow determination, in a region in which no motion is detected, there may still be motion but from earlier pictures to the current picture. Determining motion using a plurality of past decoded pictures for regions not covered in order to generate a synthesized reference picture can improve coding efficiency.

Thus, in one embodiment, in the case one or more parts of the current decoded picture are not warped in warper 511, in the case one or more parts of the current decoded picture are not so covered by either the inter-picture determined map, or the intra-picture determined map, or in another embodiment, by neither the inter-picture determined map nor the intra-picture determined map, the predicted reference picture determiner 215 includes an uncovered region predictor 513 that uses block-based motion analysis for the uncovered blocks objects or regions to determine portions of the predicted reference picture. In one embodiment, the predicted reference picture is a combination of the warped parts and the uncovered parts.

Intra-Picture Analysis by the Intra-Picture Optical Flow Analyzer

The intra-picture flow map determiner 505 is configured to determine flow within a picture, caused, for example, from camera exposure and appearing as motion blur in the picture. One embodiment of the intra-picture flow map determiner 507 uses motion blur analysis to determine motion blur direction and magnitude for each block or object or region in the current decoded picture.

Determining the optical flow includes, for each block or object or region of the current decoded picture, determining the direction and extent of the impulse response—the point spread function—that models the motion, e.g., the motion blur.

Figure 6:
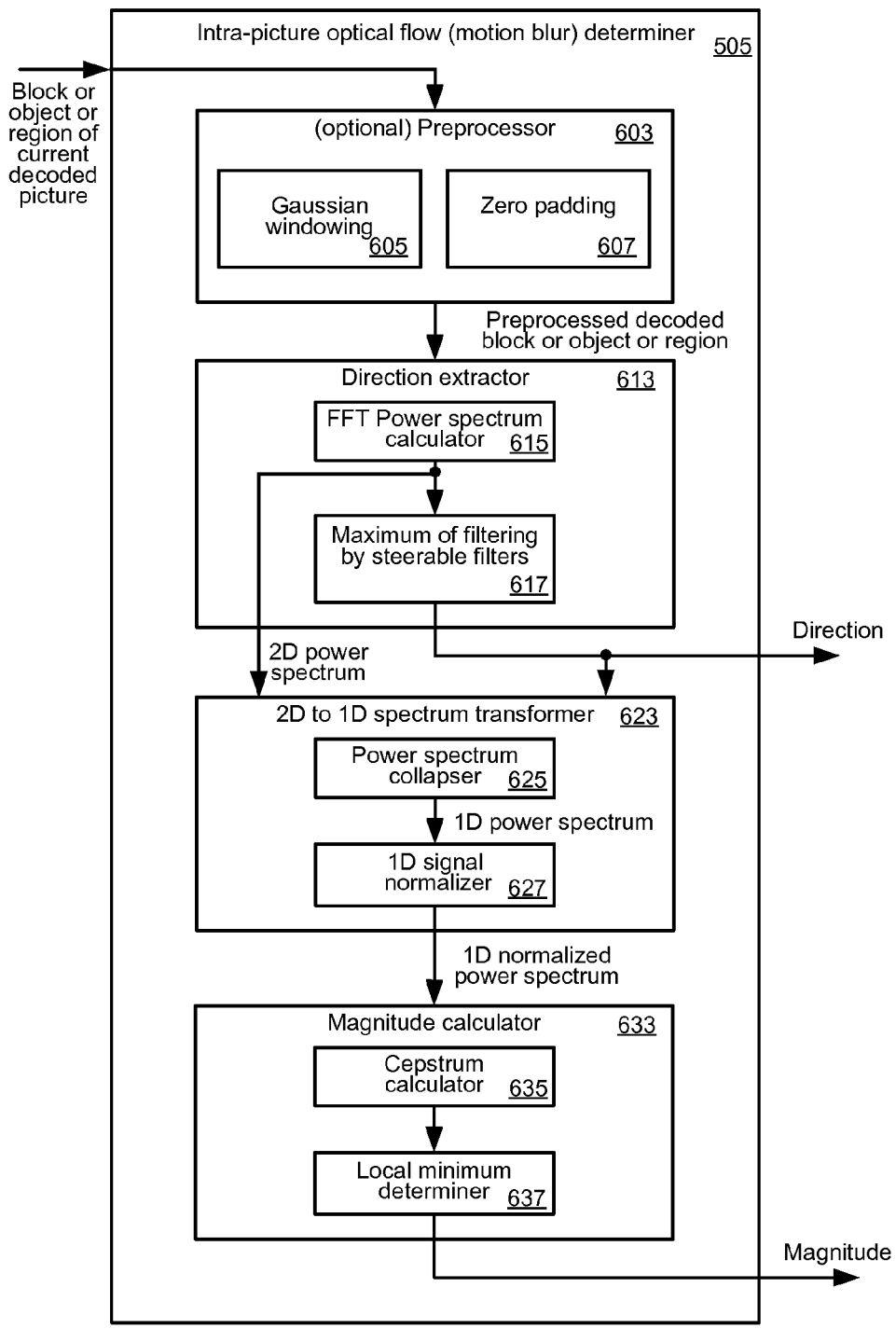
FIG. 6 shows one embodiment of an intra-picture optical flow determiner that for example determines possible motion based on only the current decoded picture and that can be used in the reference picture predictor of FIG. 5.

FIG. 6 shows one embodiment of the intra-picture optical flow determiner 505 that for example determines possible motion based on only the current decoded picture. The determiner shown in FIG. 6 is configured to calculate the optical flow for a block or object or region of current decoded picture. In one embodiment, the method using determiner 505 run a set of overlapping image segments. The determiner and associated determining method can be divided in two stages: first there is the determination of the direction of the velocity vector, and second the calculation of the magnitude of the velocity vector.

The apparatus and associated method use FFT power spectrum calculation. As would be well known to those in the art, a pre-processor that include one or both of zero-padding and windowing, e.g., with a Gaussian window can improve power spectrum accuracy. These steps are of course optional. In one embodiment, a pre-processor 603 includes both windowing, e.g., Gaussian windowing and zero-padding. Alternate embodiments use only one of these, and yet another alternate embodiment does not include the pre-processor 603. One embodiment includes a direction extractor 613 configured to accept the (possibly pre-processed) decoded block or object or region, to determine a power spectrum in power spectrum determiner 615, e.g., using the FFT or by some other method, and using a plurality of steerable filters that favor different steerable directions and determine the direction of the filter that outputs the maximum response in a maximum filter output module 617 to determine the direction of the optical flow.

The use of steerable filters is based on the well-known observation that the power spectrum of the blurred image is characterized by a central ripple that goes across the direction of the motion. In order to extract the direction of the ripple, one could determine how to find the angle in which a filter of the second derivative of a Gaussian function oriented at that angle would give the highest response. Such filters have commonly been studied in the field of computer vision, and would be known to those in the art. Such a filter can be broken down into three basis filters, so that only the responses of three filters need to be determined.

The second stage includes a two-dimensional function (2D) to one-dimensional (1D) function transformer 623 including a power spectrum dimension collapser 625 to generate a 1D power spectrum and a normalizer 627 to generate a 1D normalized power spectrum. A magnitude calculator 633 is configured to determine the velocity magnitude by determining a cepstrum in a cepstrum calculator 635 and a local minimum determiner 637 to determine the local minimum to thus determine the velocity magnitude for the optical map for the decoded picture block or object or region.

The collapsing of the two dimensional spectrum to 1D includes projecting every pixel in the 2D spectrum into the line that passes through the origin with the same orientation as the motion blur.

The spectrum is known to be usable in velocity determination for optical flow determination. The Fourier transform of a motion blur point spread function is typically in the form of a sinc-line ripple, it can be easily identified by the 1D cepstrum. Negative peaks on the 1D cepstrum provide an approximation of the velocity.

A method is described by the apparatus of FIG. 6 that straightforwardly follows the data flow and steps of the modules of FIG. 6. One aspect is that the optical flow map determination can operate in parallel for some or all the block or object or region of the picture, including the case of overlapping regions decomposed into overlapping layers.

Inter-Picture Analysis by the Intra-Picture Optical Flow Analyzer

In one embodiment, the inter-picture optical flow map may be approximated by the motion vectors using traditional motion estimation methods.

In an improved embodiment, inter-picture affine prediction includes optical flow estimation between the current decoded picture and the most recent past decoded picture from the decoded picture buffer 213 (in the multi-picture store 211). The analysis on the current decoded picture and the past decoded picture is to determine affine motion parameters. The affine motion parameters are to calculate a warped version of the recent decoded picture from the multi-picture store 211. Affine motion parameters describe the warping. In practice, the affine motion parameters are assigned to picture segments that are typically larger than macroblocks. These large picture segments usually partition the picture non-uniformly.

In such an embodiment, the inter-picture determined warped picture is determined at the coder using the following two steps:

Step 1) Estimation of an affine motion parameter set between the previous decoded picture and the current decoded picture.

Step 2) Affine warping of at least parts of the previous decoded picture to form a warped picture.

Note that because only a decoded picture is used in the affine transformations, the same process can operate at the decoder without the need to send the affine parameters to the decoder.

In a yet further improved version, the current decoded and part decoded pictures are partitioned into a plurality of overlapping layers ordered in depth from backmost layer (the background) to the foremost layer, in a manner analogous to cel animation. Each of the plurality of layers includes the following functions of position (maps): (1) an intensity map, e.g., the L-u-v color values, RGB color values, etc., as a function of position; (2) an alpha map, which defines the opacity or transparency of the layer at each position, which in one embodiment, is limited to be binary in that each layer at any point in space is either completely transparent or completely opaque; and (3) a velocity map, which describes how the map should be warped over time at each position. For video, that is, a sequence of pictures, the velocity maps operate on the respective layers over time. The intensity map and the alpha map are warped together so that they stay registered. As above for the single present decoded and past picture, when these are decomposed into layers, the velocity maps are affine transformations.

Such optical motion analysis generates a plurality of optical maps, one for each layer.

In an alternate embodiment, inter-picture multi-picture affine prediction is used to extend motion compensation from the previously decoded picture to several past decoded pictures and to predicted reference pictures formed by analysis on the current decoded picture and one or more past decoded pictures, including optical flow estimation on the current decoded picture and inter coded optical map estimation using the current decoded picture and one or more past decoded pictures. The analysis on the current decoded picture and one or more past decoded pictures is to determine affine motion parameters and to use the determined affine motion parameters to calculate one or more warped versions of picture(s) from the multi-picture store 211. Such affine motion parameters describe the warping. In practice, in contrast to translational motion compensation, affine motion parameters are assigned to picture segments that are typically larger than macroblocks. These large picture segments usually partition the picture non-uniformly. The encoding proceeds in four steps: (i) estimation of several affine motion parameter sets between the current decoded picture and one or more previous pictures, (ii) maintaining in a multi-picture buffer past decoded pictures and affine warped pictures, (iii) multi-picture block-based hybrid video encoding, and (iv) determination of the efficient number of motion models using optimization techniques, e.g., using Lagrange multipliers.

The multi-picture store 211 includes a number denoted K of past decoded pictures, and a number denoted N of warped versions of past decoded pictures—the predicted reference pictures. The multi-picture motion compensated predictor (the version of module 219 of FIG. 2, step 409 of FIG. 4) conducts block-based motion-compensated prediction using all K+N pictures (such a total denoted M) and produces a motion-compensated picture as the selected, e.g., best predicted picture. This motion-compensated picture is then used in a standard hybrid video coder.

In such an embodiment, the N predicted reference pictures are determined at the coder using the following two steps:

Step 1) Estimation of N affine motion parameter sets between the K previous pictures and the current decoded picture.

Step 2) Affine warping of N reference pictures of the N pictures to form N predicted reference pictures.

In one embodiment, the number, denoted M* of efficient reference pictures, where K<M*<K+N=M is determined by evaluating the rate-distortion efficiency for each reference picture.

The method includes generating an indication of which M* reference pictures are selected from the multi-picture store 211. Such an indication is either sent to a decoder or stored for later decoding.

Note that because only decoded pictures are used in the affine transformations, the same process can operate at the decoder without the need to send the affine parameters to the decoder.

Note also the order of transmission of indication of which reference pictures are used provides an index that is used to specify a particular reference picture on a block basis. The decoder need thus maintain only the K previously decoded reference pictures and does not maintain N complete pictures for motion compensation. Rather, for each block or macroblock that is compensated using affine motion compensation, the translational motion vector and affine motion that are determined at the decoder are combined to obtain the displacement field for that picture segment.

Processing the Optical Flows

In one embodiment of the invention, the aforementioned two optical flow maps are combined, e.g., by/in affine motion analyzer element 509 into one optical flow map, in one embodiment by a weighted average. Affine motion analysis is conducted on the optical flow map. In another embodiment, affine motion analyses may be performed on each individual optical flow maps, respectively, and the resulting motion parameters combined to form one affine motion model block or region or object on the current decoded picture before warping to creating (at least part of) a reference picture. In yet another embodiment, the two optical maps can be processed completely independently, resulting in two predicted reference pictures.

In the following description, we assume a combined optical flow map. The processes, however, can be applied to multiple optical flow maps without modification. Affine motion analysis of affine motion analyzer 509 includes finding the best affine motion model for each block or object or region. In one embodiment, finding the best affine motion model uses linear regression to fitting the optical flow map to an affine motion model. This determines a set of affine motion parameters for each block or object region.

Given the determined (estimated) affine motion parameter set, a predicted reference picture or portion thereof is generated by first warping the current decoded picture in picture warper 511. The reference picture warping is carried out by applying the affine motion parameters to each block or object or region. In one embodiment, pixel values that correspond to non-integer displacement are computed by interpolation.

One embodiment includes uncovered region predictor 513 that is configured to determine for the uncovered region of the prediction picture, pixel values for the predicted reference picture using one or more long-term reference pictures from the reference picture store 213 of previously decoded pictures. In one embodiment, for such pixels that are not covered by the affine-motion-based picture warping, their values in the predicted reference picture are determined in 513 by an average, e.g., a weighted average of selected previously decoded pictures in the long-term reference memory.

Repeating the process described above, multiple predicted reference pictures can be created by conducting partitioning the current decoded picture differently, e.g., in layers.

In one embodiment, as described above, there are multiple affine motion estimations for the same moving object, e.g., one from inter-picture optical flow and one from intra-picture. While in some embodiments uncovered region predictor 513 is based on determining a single uncovered region, in other embodiment, there can be multiple uncovered regions, each defining a different predicted reference picture. The MCP of element 219 includes searching through all predicted reference pictures, e.g. in multi-picture store 211 to determine a selected, e.g., the best reference picture for each element, e.g., each block or macroblock.

By extending long term MCP-based hybrid video to include predicted reference pictures that, e.g., include affine mappings applied using the current and at least one past decoded picture, MCP-based hybrid video coding can be greatly improved.

So long as the reference prediction process uses only data that would be available at the decoder, and so long as the reference prediction process operates at both the decoder and at the coder, no bit rate overhead is needed except that for any indication needed as to how decoder-available data is used to generate the predicted reference picture.

Different embodiments include different indication of decoder-available. Such indication forms indicator information that is generated at the encoder and transmitted to a decoder or stored for later decoding by the decoder.

A first embodiment includes indexing the extended reference picture set to indicate which previously decoded picture(s) are used for the prediction, and storing for decoding and/or sending to the decoder the index to indicate which previously decoded picture(s) of a multi-picture store 211 used in both an encoder and decoder are used to generate the predicted one or more reference pictures.

In another embodiment, the multi-picture buffer includes not only previously encoded pictures, but also one or more additional pictures as a general multi-picture store 211. One such version includes indexing the extended multi-picture store 211 contents maintained in both the encoder and decoder, and storing for decoding and/or sending to the decoder the index or other indication to indicate which contents of the multi-picture store 211. So long as the same process that is used to generate the predicted reference pictures is conducted the same way in the decoder (see FIG. 3) and in the reconstruction loop 231 of the encoder, no indication is needed for the decoder other than bits to encode the index of the selected picture(s) used and commands issued by the encoder to notify the decoder on how to organize or reorganize the multi-picture buffer so that is maintained as in the encoder.

Note that in one embodiment, a behavior (a "default action") is agreed by both the encoder and matching decoder. The encoder is configured to issue commands to notify the decoder on specific actions that differ from the agreed default action. How to so design an encoder and decoder would be clear to one of ordinary skill in the art because in the published H.264/AVC standard, a similar method is used to maintain a multi-picture store used as a long-term reference picture buffer. In embodiments of the presented invention, the multi-picture store is extended to include one or more predicted reference pictures (or another reference buffer is added to store those predicted pictures), or any alternate information needed to generate such predicted reference picture(s).

As an example, in one embodiment, it may be that only one predicted reference picture is generated with each decoded picture, and it is stored or discarded, depending on whether the corresponding decoded picture is stored or discarded. Note that just as in H.264/AVC compliant coders, there can be multiple short-term reference pictures, e.g., the past three decoded pictures, the present invention can include three predicted pictures. Then, in the decoder, when one of the decoded pictures is moved to the decoded picture buffer 213, as notified by the encoder, the corresponding predicted picture is also moved, and vice versa.

In one such example embodiment, general multi-picture store 211 is configured to store in addition to previously encoded pictures, the predicted reference pictures, so that the multi-picture store 211 combines store 213 with store 217.

In another such example embodiment, general multi-picture store 211 is configured to also store a background picture as a very long term reference in addition to previously encoded pictures. For example, in one such embodiment, an uncovered region is not necessarily predicted from currently available decoded pictures in the multi-picture store 211, but from any previously decoded pictures as long as the process is exactly the same at both the encoder and the decoder. For example, the decoder may run a background registration process that always maintains the most recent stationary picture, as determined upon one or more pre-defined stationarity detection criteria being met, as background and use such background to predict the uncovered regions.

Since the same reference prediction process will be running at both the encoder's reconstruction loop 231 and in the decoder, no bit rate overhead is needed except that for indexing the extended reference picture set to indicate which previously decoded pictures or parts thereof, or any one or more elements in the multi-picture store 211 are used for the prediction.

Many indexing methods are possible to indicate which picture(s) of the multi-picture store 211 to use for at the encoder and matching decoder. One such indexing method is described in commonly assigned U.S. patent application Ser. No. 12/051,185 to inventors Mauchly et al, titled VIDEO COMPRESSION USING SEARCH TECHNIQUES OF LONG-TERM REFERENCE MEMORY, the contents of which are incorporated herein by reference. Embodiments of the Mauchly et al. method of U.S. Ser. No. 12/051,185, adapted for the present application is using predicted reference pictures and including a predicted reference picture determiner in the reconstruction loop of the encoder, and a similar predicted reference picture determiner in a matching decoder, can reduce the number of reference pictures used for each MCP element, e.g., each macroblock to provide a further saving on the bit rate.

One embodiment similar to the method described in U.S. Ser. No. 12/051,185 includes classifying each picture in the multi-picture store 211 based on a plurality of classifiers. The classifiers may correspond to features that are found in a reference picture. A current to-be encoded picture is analyzed to determine features found in the current picture. A feature, for example, is based on an object found in the current frame. Such objects can be found by partitioning using one of various methods, as described hereinabove. As macroblocks in the current picture are encoded, a macroblock is analyzed to determine which feature may be included in the macroblock. The feature is used to determine a classifier, which is used to determine a subset of the pictures in the multi-picture store 211. The subset is then searched to determine a particular reference picture for the macroblock. For example, a motion search is performed to find a particular reference picture that includes a rectangular block of pixels that matches, e.g., best matches the pixels in the current macroblock. This found reference block is considered the best block for motion prediction. The location of this block in the particular reference picture, relative to the block in the current picture, is recorded as a motion vector. The macroblock may then be encoded using the reference block of the particular reference picture. This process may be repeated for all macroblocks of the current picture. The encoder thus performs less computation than if it had searched through all available reference pictures. The encoded picture is transmitted to a decoder or stored for later decoding. An identifier is used to identify each determined particular reference picture that was used to decode the macroblocks of the picture. The identifier is stored for later use by a decoder, or sent to the decoder, and allows the decoder to retrieve the particular reference picture from a multi-picture store 211 maintained in the decoder. The particular reference picture may then be used to decode the macroblock. As an example applicable to one embodiment of the present invention in which affine motion analysis and warping is used to determine at least part of the current decoded picture, and in which one or more previously coded pictures are used to encode the uncovered parts, and the predicted reference picture is a combination of the warped parts and the uncovered parts, the indication is of which previously encoded picture(s) is/are used to generate the uncovered parts of the predicted picture. Furthermore, in one alternate, or in addition, the indication sent to the decoder— or stored for later use by the decoder—is of a predicted one.

In one version of U.S. Ser. No. 12/051,185, usable for example in videoconferencing, the object includes a feature of a human body. In particular, wherein a feature may be based on a portion of the object found in the picture.

In one version, the identifier is used to determine the particular picture in the subset of the pictures in the multi-picture store 211 based on a position in the subset of reference pictures determined and not the position in all of the stored pictures in the subset of the pictures in the multi-picture store 211.

The encoder determines the identifier by performing the determination of the subset of the pictures in the multi-picture store 211 that the decoder performs and determines the position in the subset of the pictures in the multi-picture store 211 for the particular reference picture.

While one embodiment combines inter-picture determined optical flow and intra-picture optical flow, another simpler embodiment includes only inter-picture determined optical flow.

It should be appreciated that while not many details have been provided herein on the operation of transform and quantizer module 205, corresponding block 413 of the flowchart of FIG. 4, and the inverse quantizer and inverse transform elements 207 and 307, and corresponding process step 415, how to implement such elements would be clear to those in the art. One embodiment uses a transformer and quantizer (and matching inverses) substantially as described in the H.264/AVC standard. Other embodiments use a transformer and quantizer substantially as described in the Chinese AVS standard described in www~dot~avs~dot~org~dot~cn/en/ (retrieved 16 Mar. 2009) where ~dot~ denotes the period "." in the actual URL. Yet another is as described in MPEG-2. Yet another is a described by ITU recommendation H.263. The invention is not limited to any particular hybrid coding method, and can readily be incorporated in many such methods, whether defined by a published standard, or not.

Unless specifically stated otherwise, as apparent from the following discussions, it is appreciated that throughout the specification discussions utilizing terms such as "processing," "computing," "generating", "calculating," "determining" or the like, refer to the action and/or processes of an apparatus element, or of an computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

In the description herein, as is common, the terms coding and encoding are used interchangeably.

The methodologies described herein are, in one embodiment, performable by one or more processors that accept computer-readable (also called machine-readable) logic in some embodiments encoded on one or more tangible computer-readable storage media containing a set of instructions that when executed by one or more of the processors carry out at least one of the methods described herein, while in other embodiments encoded as hardware elements with or without programmable element(s). In the case of instructions, any processor capable of executing a set of instructions (sequential or otherwise) that specify actions to be taken are included.

Thus, one example is a typical processing system that includes one or more processors. Each processor may include one or more of a CPU, a graphics processing unit (GPU), and a programmable DSP unit. The processing system further may include a memory subsystem including main RAM and/or a static RAM, and/or ROM. A bus subsystem may be included for communicating between the components. The processing system further may be a distributed processing system with processors coupled by a network. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable storage medium may form, or be included in a computer program product that is an article of manufacture by being configured during manufacture to incorporate the code, and in some versions to also incorporate one or more processing elements therewith.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a set-top box (STB), a terminal interface for a teleconferencing terminal, a web appliance, or be in a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable storage medium configured with a set of instructions, e.g., a computer program that are for execution on one or more processors, e.g., one or more processors that are part of a coder, a decoder, or a codec. In one embodiment, the modules of FIG. 2 and/or of FIG. 3 include the processing elements and respective portions of the storage subsystems shown in FIG. 1B that include respective portions of code that when executed cause the functions of the elements of FIG. 2 or FIG. 4, and/or FIG. 3 to be performed. In alternate embodiments, the modules of the apparatuses shown in FIG. 2 and/or FIG. 3 include special purpose hardware configured to perform the herein described functions. Note those in the art understand how a computer program for performing a processing function can be used to automatically design the appropriate set of logic gates of such special purpose hardware, e.g., even automatically by compiling software descriptions to implement the hardware design that can then be fabricated as hardware. Thus, as will be appreciated by those skilled in the art, embodiments of the present invention may be embodied as a method, an apparatus such as a special purpose apparatus, an apparatus such as a data processing system, or a tangible computer-readable storage medium, e.g., a computer program product. The computer-readable storage medium stores logic, e.g., in the form of sets of instructions that when executed on one or more processors cause a processor or processors to implement the elements described herein, or in the form of logic circuits. Accordingly, alternate embodiments of the present invention may take the form of a method, an entirely hardware embodiment, an entirely software embodiment or an embodiment combining software and hardware aspects. Furthermore, some embodiments of the present invention may take the form of a tangible computer-readable storage medium that include computer-readable program code embodied in the medium.

While the storage medium is shown in an example embodiment to be a single medium, the term "storage medium" should be taken to include a single medium or multiple storage media (e.g., a centralized or distributed database, and/or associated caches and servers) that store the one or more sets of instructions. A storage medium may take many forms, including but not limited to, non-volatile media and volatile media. Non-volatile media includes, for example, optical, magnetic disks, and magneto-optical disks. Volatile media includes dynamic memory, such as main memory. For example, the term "storage medium" shall accordingly be taken to include, but not be limited to, in one set of embodiment, a tangible computer-readable storage medium, e.g., a solid-state memory, or a computer software product—encoded in computer-readable optical or magnetic media forming an article of manufacture.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All patents, and U.S. patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B; such a path may include other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus for coding comprising:
   a forward coder operative to accept a current picture of a video sequence and a motion-compensated prediction picture, and to determine quantized transform coefficients of a difference picture; and
   a reconstruction module coupled to the forward coder and comprising:
      a reference picture predictor that uses one or more previously decoded pictures to determine one or more predicted reference pictures; and
      a motion compensated predictor coupled to the reference picture predictor and operative to determine, from one or a plurality of the one or more predicted reference pictures, a motion-compensated prediction picture and any motion vectors used to determine the motion-compensated prediction picture,
   such that the only overhead needed to be sent to or stored for a decoder that includes a decoder reference picture predictor that uses the quantized transform coefficients of the difference picture and one or more previously decoded pictures that are stored in the decoder in a multi-picture store is an indication of what data in the decoder multi-picture store is used by the decoder, or how the data is organized in the decoder's multi-picture store.

2. An apparatus as recited in claim 1, wherein the reconstruction module comprises a multi-picture store coupled to the reference picture predictor.

3. An apparatus as recited in claim 1, wherein the reference picture predictor includes an optical flow analyzer carrying out affine motion analysis to determine affine motion parameters, affine motion analysis carried out in combination with image warping, the optical flow analyzer determining at least a portion of at least one reference picture,
   wherein affine motion parameters need not be transmitted to a decoder or stored for later decoding.

4. An apparatus as recited in claim 3, wherein the reference picture predictor further includes, for one or more portions of the difference picture uncovered by the optical flow analyzer, a predictor configured to predict the uncovered one or more portions using one or more previously decoded pictures.

5. An apparatus as recited in claim 3, wherein the optical flow analyzer includes an intra-picture optical flow analyzer that uses the present decoded picture to predict motion in an intra-picture set of one or more parts of a current decoded picture combined with affine motion analysis and image warping to determine at least a corresponding intra-picture set of one or more parts of at least one of the reference pictures.

6. An apparatus as recited in claim 3, wherein the optical flow analyzer further includes an inter-picture optical flow analyzer that uses the present decoded picture and one or more previously decoded pictures to predict motion in an intra-picture set of one or more parts of a current decoded picture combined with affine motion analysis and image warping to determine at least a corresponding intra-picture set of one or more of at least one of the reference pictures.

7. An apparatus as recited in claim 6, wherein the optical flow analyzer includes an intra-picture optical flow analyzer that uses the present decoded picture to predict motion in an intra-picture set of one or more parts of a current decoded picture combined with affine motion analysis and image warping to determine at least a corresponding intra-picture set of one or more parts of at least one of the reference pictures.

8. An apparatus as recited in claim 3, further comprising at least one or more processors, and at least one storage medium configured with instructions that when implemented, carry out the functions of the forward coder and the reconstruction module.

9. A method of coding comprising:
determining quantized transform coefficients of a difference picture, the difference picture determined from a current picture of a video sequence and from a motion-compensated prediction picture calculated from at least one predicted reference picture and any motion vectors used to calculate the motion-compensated prediction picture, the at least one predicted reference picture determined from one or more previously decoded pictures,
such that the only overhead needed to be sent to or stored for a decoder that includes a decoder reference picture predictor that uses the quantized transform coefficients of the difference picture and one or more previously decoded pictures that are stored in a decoder multi-picture decoder store is an indication of what data in the decoder multi-picture store is used by the decoder, or how the data is organized in the decoder multi-picture store.

10. A method as recited in claim 9, wherein determining a block of the motion compensated predicted picture includes searching through a plurality of predicted reference pictures to determine a selected predicted reference picture for the block.

11. A method as recited in claim 9, wherein the determining the at least one predicted reference picture includes optical flow analyzing that uses a current decoded picture and that may use one or more previously decoded pictures to predict motion in a set of one or more parts of a current decoded picture, combined with affine motion analyzing and image warping for determining at least a portion of at least one predicted reference picture,
wherein affine motion parameters determined by the affine motion analysis need not be transmitted to a decoder or stored for later decoding.

12. A method as recited in claim 11 wherein the determining the at least one predicted reference picture further includes, for one or more portions uncovered by the affine motion analyzing, determining the uncovered one or more portions using one or more previously decoded pictures,
such that the at least one predicted reference picture includes the uncovered region predicted using the previously decoded picture and the at least a portion determined by the optical flow analyzing.

13. A method as recited in claim 11, wherein the optical flow analyzing includes intra-picture optical flow analyzing that uses the present decoded picture to predict motion in an intra-picture set of one or more parts of a current decoded picture combined with the affine motion analyzing and the image warping to determine at least corresponding intra-picture set of one or more parts of at least one of the reference pictures.

14. A method as recited in claim 11, wherein the optical flow analyzing includes inter-picture optical flow analyzing that uses the present decoded picture and one or more previously decoded pictures to predict motion in one or more picture parts of a current decoded picture combined with affine motion analysis and image warping to determine at least corresponding one or more parts of at least one of the reference pictures.

15. A method as recited in claim 10, wherein the further comprising storing the at least one predicted reference pictures in a multi-picture store,
wherein determining a block of the motion compensated predicted picture includes searching through a plurality of predicted reference pictures in the multi-picture store to determine a selected predicted reference picture for the block.

16. A non-transitory computer-readable storage medium encoded with instructions that when executed by one or more processors of a processing system, carry out a method of coding comprising:
determining quantized transform coefficients of a difference picture, the difference picture determined from a current picture of a video sequence and from a motion-compensated prediction picture calculated from at least one predicted reference picture and any motion vectors used to calculate the motion-compensated prediction picture, the at least one predicted reference picture determined from one or more previously decoded pictures,
such that the only overhead needed to be sent to or stored for a decoder that includes a decoder reference picture predictor that uses the quantized transform coefficients of the difference picture and one or more previously decoded pictures that are stored in a decoder multi-picture decoder store is an indication of what data in the decoder multi-picture store is used by the decoder, or how the data is organized in the decoder multi-picture store.

17. A non-transitory computer-readable storage medium as recited in claim 16, wherein determining a block of the motion compensated predicted picture includes searching through a plurality of predicted reference pictures to determine a selected predicted reference picture for the block.

18. A non-transitory computer-readable storage medium as recited in claim 16, wherein the determining the at least one predicted reference picture includes optical flow analyzing that uses a current decoded picture and that may use one or more previously decoded pictures to predict motion in a set of one or more parts of a current decoded picture, combined with affine motion analyzing and image warping for determining at least a portion of at least one predicted reference picture,
wherein affine motion parameters determined by the affine motion analysis need not be transmitted to a decoder or stored for later decoding.

19. A non-transitory computer-readable storage medium as recited in claim 18, wherein the determining the at least one predicted reference picture further includes, for one or more portions uncovered by the affine motion analyzing, determining the uncovered one or more portions using one or more previously decoded pictures,
such that the at least one predicted reference picture includes the uncovered region predicted using the previously decoded picture and the at least a portion determined by the optical flow analyzing.

20. A non-transitory computer-readable storage medium as recited in claim 18,
- wherein the optical flow analyzing includes one or both of intra-picture optical flow analyzing and inter-picture optical flow analyzing,
- wherein the intra-picture optical flow analyzing uses the present decoded picture to predict motion in an intra-picture set of one or more parts of a current decoded picture combined with the affine motion analyzing and the image warping to determine at least corresponding intra-picture set of one or more parts of at least one of the reference pictures, and
- wherein the inter-picture optical flow analyzing uses the present decoded picture and one or more previously decoded pictures to predict motion in an inter-picture set of one or more picture parts of a current decoded picture combined with affine motion analysis and image warping to determine at least a corresponding inter-picture set of one or more parts of at least one of the reference pictures.

* * * * *